Dec. 10, 1968   R. E. ROBARGE   3,415,487
MAGNETIC CONTROL VALVE WITH CONCENTRIC COILS
Filed May 16, 1966

INVENTOR.
ROBERT E. ROBARGE
BY
Adams & Cuayna
ATTORNEYS

# United States Patent Office 3,415,487
Patented Dec. 10, 1968

3,415,487
MAGNETIC CONTROL VALVE WITH CONCENTRIC COILS
Robert E. Robarge, Minneapolis, Minn., assignor to North American Plastics, Edina, Minn., a corporation of Minnesota
Filed May 16, 1966, Ser. No. 558,533
3 Claims. (Cl. 251—137)

ABSTRACT OF THE DISCLOSURE

This invention relates to a solenoid valve structure designed to open against a pressure. The force required to open a valve is normally greater than that required to maintain the valve in open position, and the valve therefore includes a pair of magnetic coil members arranged in concentric relation with respect to an internal valve member whereby a relatively large force may be initially placed on the valve member and the force thereafter reduced. In order to protect the valve housing from heat damage the means for effecting the magnetic force reduction is designed to be heat sensitive.

---

Figure 1:
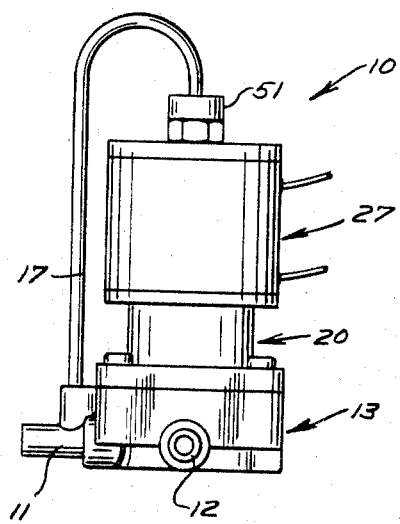

In the past various solenoid type liquid flow control valves have been provided which are operated and controlled from outside of the flow conduit while the plunger or closing member of the valve is located within the conduit. In valves of this type communication with and control of the plunger is afforded through the conduit by the establishment of a magnetic field. Applicant has found that certain advantages are to be obtained by producing these valves of plastic materials. Such advantages include manufacturing convenience, the ability to carry fluids without contamination and the possibility of providing a solenoid valve wherein the field producing coil is integrally formed with the remainder of the valve body.

Through the invention disclosed herein applicant provides a valve which permits unitary construction and includes an integral magnetic field generating device, a valve housing and an inner controlled valving member. In providing this unit certain difficulties and problems inherent to plastic materials have been solved and it is a solution to these problems which have afforded certain success in the market place for the valve.

In order to provide a positive sealing solenoid valve applicant provides inlet pressure communication to assist in closing a valve member and holding the same in closed position. Upon opening the valve member this additional closing pressure must be overcome and a relatively stronger magnetic force must be generated to open against inlet pressure is required to hold the valve in open position. With the use of plastic material the high magnetic initial opening force generates a certain amount of heat which heat could be detrimental to the plastic. Therefore applicant has incorporated a two step magnetic field which field will be reduced upon opening the valve such that upon continued operation the plastic material will not be raised to a dangerous temperature.

It is therefore an object of applicant's invention to provide a positive closing solenoid valve member which closing is assisted by fluid under inlet pressures.

It is a further object of applicant's invention to provide a solenoid valve or the like formed from a plastic material.

It is a further object of applicant's invention to provide at least a dual magnetic field system for use with a solenoid valve having at least a housing of plastic material which dual system will prevent a temperature rise of the unit above a critical plastic damaging level.

Figure 2:
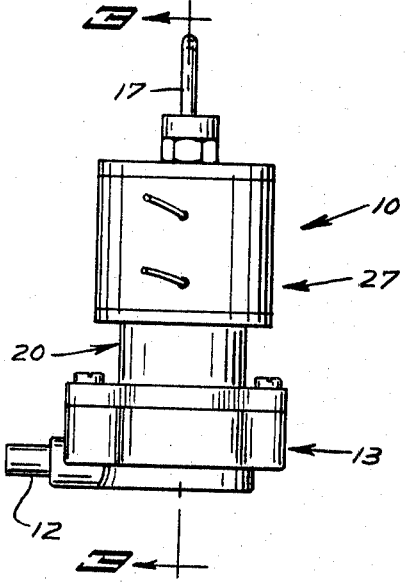
Figure 3:
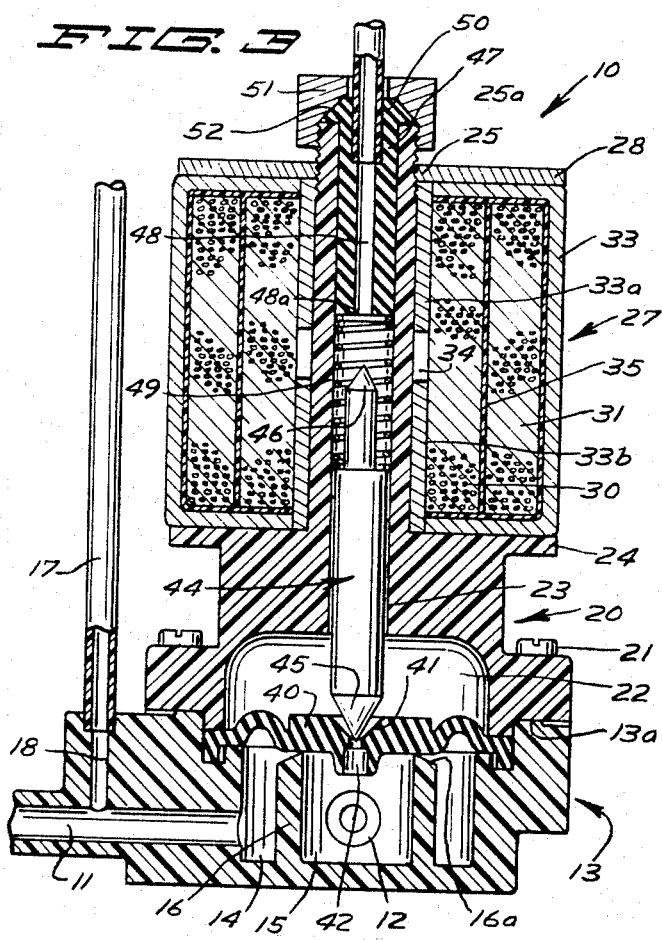
Figure 4:
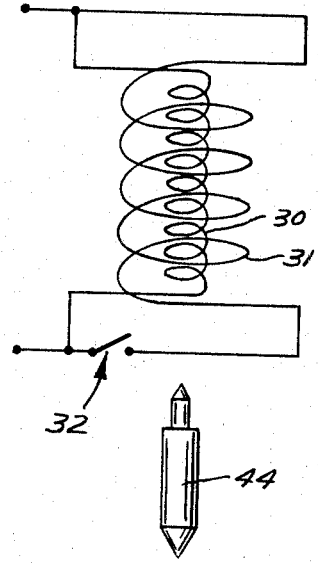

These and other objects and advantages of my invention will more fully appear from the following description made in connection with the accompanying drawings, wherein like reference characters refer to the same or similar parts throughout the several views, and in which:

FIG. 1 is a front elevation of a solenoid valve incorporating the concepts of applicant's invention;
FIG. 2 is a side elevation of the unit;
FIG. 3 is a vertical section taken substantially along line 3—3 of FIG. 2; and
FIG. 4 is a schematic diagram of the electrical circuitry of the valve.

In accordance with the accompanying drawings the valve 10 incorporating the concepts of applicant's invention is arranged for insertion into a flow line by providing an inlet 11 and outlet 12 integrally formed with a first base housing 13. Inlet conduit 11 communicates with a circumferentially formed passage 14 within housing 13 and is separated from an outlet communicating chamber 15 by a seating ring 16 extending generally upward within housing 13 and providing a seating edge 16a on the upper most end thereof. A by-pass conduit 18 in the form shown communicates with a by-pass passage 17 receiving fluid under inlet pressure from inlet conduit 11. The purpose of this conduit 18 will be described hereinafter. The entire base housing 13 is in the form shown of a plastic material.

An upper housing member 20 again of plastic material is securely seated and fastened to an upper surface 13a of housing 13 through a plurality of cap screws 21 or the like and a generally dome based chamber 22 is provided in housing 20 to generally overlie the inlet 14, outlet chamber 15 and seating ring 16 of housing 13. A longitudinal passage 23 communicates with chamber 22 and extends longitudinally upwardly through housing 20 to provide communication entirely through said housing.

A first and supporting shoulder 24 is provided in radially extending relation to a coil mounting shaft 25 of upper housing 20 which shaft 25 defines the longitudinal passage 23 therewithin. Threads 25a are provided on the upper end of said shaft 25. Shoulder portion 24 is arranged as a stop for placement of an electrical coil generally designated 27 thereon. A coil 27 may be integrally wound about shaft 25 or may consist of a separable coil received about shaft 25 for seating against shoulder 24 so as to position the same properly along shaft 25. An upper retaining ring member 28 is provided to securely hold either type of coil against the shoulder portion 24 of the housing 20.

Coil 27 in either form includes a dual coil construction having a first inner coil 30 and a second outer coil 31. Coils 30–31 may consist of two individual coils as illustrated in FIGS. 3 and 4 with a switching mechanism 32 for selecting the proper coil combination. Such mechanism 32 could include a bi-metal switch responsive to the heat generated by the coil 27 for switching from what may be classified as a strong to a weak coil combination. The basic idea behind this coil construction is to provide an initial high magnetic force for actuating the valve portion of the unit 10 and after opening the same to shift to a single coil operation or lower magnetic force for maintaining the valve in open position. The remainder of the coil construction is generally known in the trade and includes a coil frame 33 surrounding the coils 30–31 with a flux gap 34 formed on the internal surface of the frame to provide an operable flux field point to control the valving portions of the unit. An integrally wound coil may be provided about housing 20 by utilizing the area between shoulder 24 and top retaining ring 28. In this modification, flux plates would be utilized about shaft 25 in place of the inner frame portions 33a, and 33b and the unit would serve as a bobbin upon which the coils would be wound. These plates 33a, 33b could be molded directly into shaft 25 or positively secured thereto after molding.

The interior valve portions of the unit 10 includes a closure diaphragm 40 mounted between the lower 13 and upper housing 20 to be in position to seat against valve seat 16a and provide a chamber 22 therebehind. Diaphragm 40 is free to flex upwardly into chamber 22 to permit communication between the inlet conduit 11 and outlet conduit 12. In the form shown a conical seat 41 is provided centrally of the diaphragm 40 and a passage 42 therethrough permits communication between chambers 15 and 22 of the unit. A plunger mechanism 44 which is the actual flow control device of the unit is, in the form shown, of generally cylindrical shape having a conical surface 45 on one end thereof to seal against seat 41 and a reduced conical surface 46 on the other end thereof.

An insert member 47 is received into the longitudinal passage 23 of the housing 20 at the upper end thereof and defines a passage 48 therethrough which passage provides a seat 48a at the lower most end thereof in aligned relation to the conical surface 46 of plunger 44. A compression spring member 49 is in the form shown provided between plunger 44 and insert member 47 to normally drive the plunger 44 downwardly.

The uppermost portion of insert 47 consists of a frusto-conical extension 50 having a base diameter to permit the same to overlie the end of shaft 25. A threaded capturing element 51 having a tapered inner clamping portion 52 to agree with the frusto-conical extension 50 is provided for engagement with threads 25a of shaft 25 to position and hold insert 47. Conduit 17 in the form shown is received into passage 48 of insert 47 and is likewise positively held therein when capturing element 51 is threaded onto shaft 25 due to an inwardly directed force resulting from the melting of the conical and tapered surfaces. It has been found that insert 47 should be a high temperature resistant material while retaining a high degree of resiliency to permit the conical surface 46 of plunger 44 to be received thereagainst and seal the flow therethrough. The resiliency of insert 47 is particularly necessary when an alternating current is used to energize the coils as the plunger 44 will tend to oscillate in response to the cycles of the current and the oscillation must not break this seal.

In operation the valve illustrated provides inlet water to conduit 11 and likewise this inlet water will, when the valve is in the position shown in FIG. 3, balance the inlet pressure by filling chamber 22 and acting against diaphragm 40. The unbalanced sealing force is obtained by spring 49 which forces plunger 44 and thus diaphragm 40 into sealing position. Upon actuation of the solenoid 27 with the dual system provided both coils will draw plunger 44 upwardly into the magnetic field center and into sealing position against seat 48a of insert 47. Water in chamber 22 is now free to flow through passage 42 in diaphragm 40 to outlet 12. Upon sufficient flow of such liquid from chamber 22 the inlet pressure in conduit 11 and passage 14 will force diaphragm 40 upwardly to permit full flow to the outlet 12. After a predetermined time or in an alternative after the heat generated by coil 27 will reach a critical point and the switching function will occur to cut off the dual coil and allow only the single coil to be energized. It should be obvious that after diaphragm 40 has opened the full force of the water will not be against the now seated plunger 44 through conduit 17 and therefore a lesser force will be required to seal the plunger against seat 48a. When closure of the valve is required the coil is de-energized and spring 49 will force the plunger to close the conical seat 41 and passage 42 and open passage 48 to full flow. When this occurs water pressure flowing through conduit 17 will build up behind diaphragm 40 thus balancing the inlet flow through conduit 11 and assisting in closing the valve.

It should be obvious that this same structure incorporating a dual coil system could be utilized on other types of valves such as positive seat valves and would be of particular interest wherever an opening valve force must be exerted against fluid from a high pressure source in that it is obvious in such a situation the necessary force to open a valve would definitely be higher than that required to hold the valve open. This situation could result in high temperature damage to the valve housing if the housing material were of a low temperature resistant material such as plastic.

It should be obvious that applicant has provided a new and unique solenoid valve structure which may incorporate an integral coil unit with built in safe guards against high temperature material deterioration.

It will, of course, be understood that various changes may be made in the form, details, arrangements and proportion of parts without departing from the scope of the invention, which generally stated consists in the matter set forth in the appended claims.

What I claim is:
1. A fluid flow control valve including:
 (a) a housing;
 (b) an inlet into said housing;
 (c) an outlet from said housing;
 (d) a valve seat within said housing between said inlet and outlet;
 (e) a magnetically responsive valve member arranged to control flow through the valve and being in seating relation to said seat within said housing; and
 (f) means for generating a magnetic field about said housing for controlling the position of said valve member; said means including:
  (1) a pair of electrical, parallely connected, concentrically arranged coil members, surrounding at least a selected portion of said housing to provide a single magnetic flux area;
  (2) means for initially energizing said coil members to shift said valve member to open said seal; and
  (3) means for de-energizing a first of said coil members while retaining energization of the second of said coil members to hold said valve member in open position.

2. The structure set forth in claim 1 and said means for de-energizing said first coil member includes a temperature responsive switch member.

3. The structure set forth in claim 2 and said housing being compiled of a plastic material which is deformable at a predetermined temperature and said switching means arranged to de-energize said first coil member at a temperature and said second coil normally operating at a temperature below said predetermined temperature.

References Cited
UNITED STATES PATENTS

| | | | |
|---|---|---|---|
| 2,089,279 | 8/1937 | Loeffler | 251—137 |
| 2,366,121 | 12/1944 | Martin-Hurst | 251—139 X |
| 2,607,368 | 8/1952 | Mayer | 251—139 |
| 2,830,743 | 4/1958 | Rimsha et al. | 251—139 X |
| 2,936,780 | 5/1960 | Pratt | 251—30 X |
| 3,012,581 | 12/1961 | Wilson | 251—139 X |
| 3,190,608 | 6/1965 | Hassa | 251—137 X |

ARNOLD ROSENTHAL, *Primary Examiner.*

U.S. Cl. X.R.

251—30, 139